Patented June 10, 1941

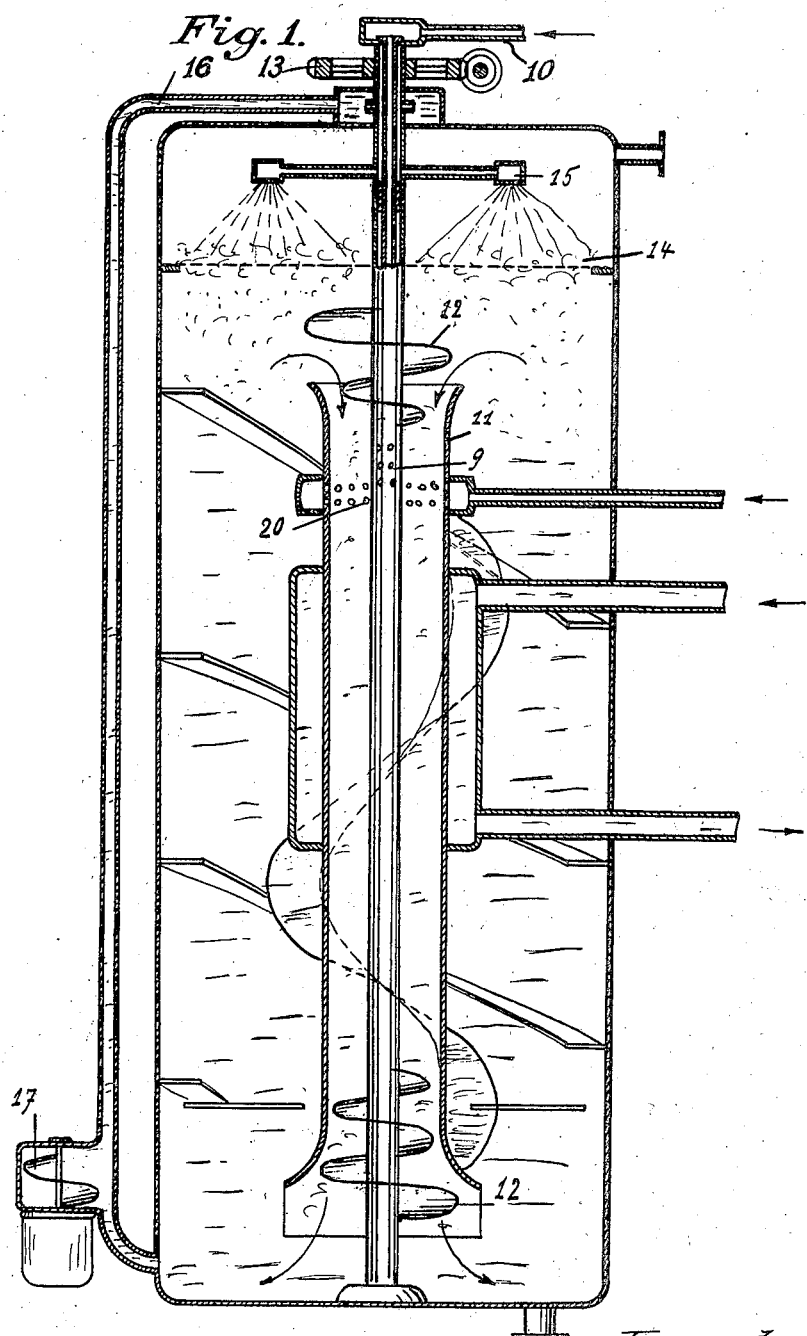

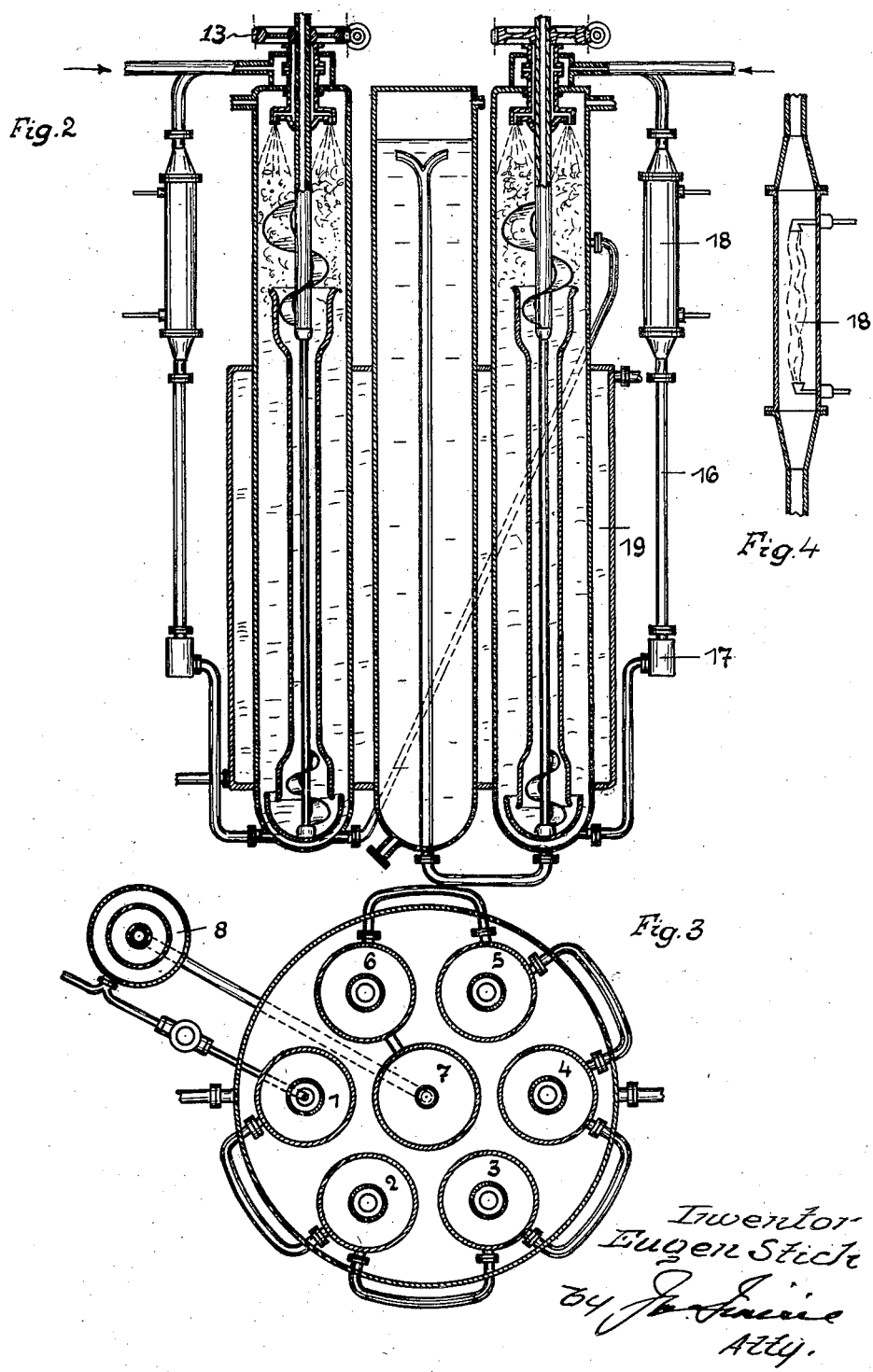

2,244,902

UNITED STATES PATENT OFFICE 2,244,902

PROCESS FOR THE AUTOMATIC CULTIVATION OF YEAST

Eugen Stich, Mannheim, Germany

Application December 23, 1938, Serial No. 247,474
In Germany December 23, 1937

8 Claims. (Cl. 195—95)

This invention relates to a process and apparatus for the automatic cultivation of yeast.

Large consumers of baker's yeast, nutrient yeast and yeast for fodder desire to produce their yeast themselves by a continuous process to save the cost of transportation, losses due thereto, etc. Such a process must be capable of producing generations of yeast cells without any appreciable degeneration and loss of force and keeping quality and, furthermore, must require the lowest possible supply of air while permitting to combat the scum in a very simple manner.

According to the invention, the yeast-containing mash is caused to pass through a number of containers arranged one after another from top to bottom and vice versa while being supplied with nutrients and the oxygen or fresh air required for the metabolism of the cells, all yeast cells contained in the mash being brought into contact with fresh air as often as desired by regulating the speed of rotation. Some of these containers serve for furthering the growth of the yeast cells, others for ripening and the last ones for regenerating the cells. After completion of the ripening period of the yeast a portion thereof is ready for consumption, and another portion returns as pitching yeast to the cycle through the medium of the regenerating containers.

The quantity of yeast produced by the process per unit of time can be readily varied by varying the feeding of nutrients or the temperature of the mash or the supply of oxygen. The device for performing the process according to the invention comprises a number of containers disposed one after another. A plurality of these containers is provided inside with driving means, as turbines or screws, for guiding the mash to be ventilated in a downwardly extending stream. Air or oxygen enters the liquid near the level thereof and covers the greatest possible distance while passing through it to prolong as much as possible the time of contact with the yeast cells. Owing to the entrance of the air on the level of the liquid, the blast pressure is reduced in accordance with the height of liquid saved, and the further isothermic compression by the fluid stream permits a saving of work. A special feature of the process according to the invention is that the various yeast cells are brought again and again into contact with fresh air, and this happens the more frequently the greater the speed at which the mash is rotated. The ventilating methods hitherto in use are objectionable in this respect, as the upper cells constantly receive air relatively poor in oxygen for the reason that the oxygen supplied from below, particularly in case of high tanks, is partly consumed already.

The invention is illustrated, by way of example, in the accompanying drawings, in which Figure 1 is a longitudinal section of a container through which the mash is guided and in which it is ventilated; Figs. 2 and 3 are, respectively, a longitudinal section and a plan of a plurality of containers arranged one after another for propagating purposes to form a culture system; and Fig. 4 indicates how the cells are irradiated while the mash flows through a pipe.

The device for carrying out the process comprises several interconnected containers. The containers 2 to 6 serve for the propagation or growth of the yeast, the container 1 is intended for regeneration, the container 7 for ripening and 8 is a separator. Within the containers 1 to 6 hydraulic screws 12, turbines or similar means are rotated by a pulley 13 and drive liquid in a pipe 11 surrounding them and being open below and on top in downward direction and then up again between the pipe 11 and the wall of the container. A turbine may be provided both at the upper and lower end of the pipe 11, or instead of the turbines a hydraulic screw may extend through the entire pipe, in which case a vacuum can be produced by increasing the pitch in the lower portion of the screw. It is further possible to provide the pipe 11 with helical surfaces 20' which impart rotation to the flowing liquid or to rotate the pipe itself. The air required for ventilation is drawn in either by the upper turbine which projects somewhat beyond the level of the liquid or supplied by special ventilating means connected with the driving shaft for the turbine 12 in such manner that the air is fed through the ducts 10 to the hollow shaft and enters through the openings 20 into the downwardly flowing liquid. The ventilating means are preferably disposed near the level of the liquid and may be rotated. If the mash is drawn up into the container, the ventilating means may be provided also at the bottom of the container, preferably where a vacuum space produced by the flow is located.

Above the sieves 14 limiting the height of the scum head nozzles 15 are arranged which preferably also rotate on their arms and are fed with a portion of the mash liquid by means of the conduit 16 and the circulating pump 17. Within these conduits or in the other connecting pipings between two containers means 18 for irradiating the yeast cells can be positioned. Furthermore, while the mash flows through these conduits its temperature can be regulated by supplying or discharging heat at 19.

When this automatic apparatus is in operation, a certain amount of yeast-containing mash continuously flows from the ripening container 7 to the separator 8. A portion of the separated yeast is consumed for its intended use, and another portion flows to the regenerating container 1 and then through the growth promoting containers 2 to 6 back again to the ripening container 7. The production of yeast per hour depends therefore solely upon the amount of mother yeast $Q_m$ removed every hour from the separator 8 and flowing to the regenerator 1, the factor $q$ indicating the hourly growth of the quantity of yeast $Q_g$ found in the containers 2 to 6, and the time $n$ during which the yeast is allowed to grow in these containers, the condition being, however, that this time $n$ must correspond always to the time required for alternate generation, that is, for doubling the number of cells once or several times. The total amount of yeast $Q_g$ found in the containers 2 to 6 will thus be covered by the formula $$Q_k = Q_m \frac{(q^{n+1}-1)}{q-1} - Q_m$$

Apparatus of this type would continually supply yeast if there were no degeneration. According to the invention, degeneration up to a certain number of alternations of generations, say, 80 to 100, is prevented as follows:

(1) The capacity of the growth promoting containers is increased, the feeding of nutrients retarded, the temperature of the mash lowered and the supply of oxygen reduced, so that the conversion of energy of the cells relative to the time unit is diminished. This decrease in the transformation of energy prolongs the vitality of the cells.

(2) In the circulation pipe 10 the yeast contained in the mash is periodically irradiated by short waves.

(3) The yeast cells coming out of the separator 8 are revitalized in the regenerating container 1 by known means, as by the addition of ovarial hormones, before passing again through the growth promoting containers.

For example, if the quantity of yeast $Q_m$ coming out of the separator 8 is equal to one-half the amount of yeast obtained every hour from the ripening container $g$, the quantity of yeast contained in the entire system will have doubled in 3 hours, or 48 alternations of generations will occur in 6 days, and it is only necessary to produce anew the amount of pitching yeast $Q_m$ once a week at most. The quantity of pitching yeast is thus reduced to 2.08% and even to 1.25% if the possibility of 80 alternations of generations is made use of. A further reduction takes place when the amount of mother yeast is decreased. Continuous production of yeast is therefore possible by continually depriving the separator 8 of a certain amount of yeast intended for consumption, no matter whether for baking, nourishment or fodder, removing a second portion therefrom to serve as mother or pitching yeast and re-introducing this second portion into the apparatus for further growth.

The adaptation of air supply to the amount of oxygen required in respiration by a certain type of yeast is the most characteristic feature of the new process and of the automatic apparatus for the culture of yeast described. In each growth promoting container the ventilating means 9 or 20 are disposed directly underneath the level of the liquid mash in a pipe 11 through which the mash flows in downward direction. Having been saturated with air bubbles, the mash then enters the associated growth promoting container, flows upwardly and after it has been saturated with air bubbles is forced or drawn again into the pipe 11 by means of the hydraulic screw or propeller 12. In this way, constant circulation of the mash from top to bottom, and vice versa, is insured. A portion of the air bubbles leaves the mash and on the top thereof forms a froth or scum the height of which is determined by a perforated cover disposed above the mash.

The supply of fresh air or oxygen through the ventilating means 9 or 20 can thus be accurately controlled in accordance with the respiratory requirements of the yeast or the particular breed concerned. This control involves an extraordinary reduction of the amount of fresh air and a corresponding decrease of the quantity of froth which depends entirely upon the amount of discharged waste gases the main constituents of which are nitrogen and carbonic acid. For example, if the atmospheric oxygen is completely utilized and 1 kg. yeast cells require 20 liters oxygen per hour for respiration, the quantity of air supplied per hour and per 1 kg. yeast content of the mash will be 100 liters. Should the mash contain 80 kg. yeast, the amount of air to be supplied per hour and per cbm. mash will be 8 cbm.

The size of the gas bubbles is determined by their outlet openings and also by the velocity of flow of the mash in the pressure pipe. When the liquid is rotated in the pressure pipe 11, the size of the outcoming gas bubbles will be influenced thereby and also by the rotation of the ventilating means within the pipe in opposite direction. In the growth promoting container rotation may be imparted to the mash rising therein by suitable guiding faces so as to lengthen the path of the ascending air bubbles and thereby enlarge their dynamic surface. As under these conditions of flow the air bubbles, owing to their buoyancy, are always in relative motion to the mash and its content of yeast cells, their surface will contact with that of the cells many times more than if they were in a position of rest. This factor is of decisive importance for utilizing the oxygen of the amount of air supplied per second.

The quantity of scum produced approximately corresponds to the amount of waste gases emitted by each cbm. of mash. This scum is destroyed by mash coming out of the growth promoting container and being sprayed by a pump 17 through nozzles 15 attached to a rotary arm upon the scum passing through a perforated plate 14. The height of the scum in which the yeast cells develop particularly lively if they have still enough oxygen is therefore determined by the distance at which the perforated plate 14 is disposed above the level of the mash in the growth promoting container. The nozzles 15 may serve also for conducting the dissolved nutritive substances to the growth promoting container, in which case they will pass the scum layer and supply the yeast cells enriched therein with the necessary nutrients, so that the formation of starvation types of yeast cells in the scum is avoided.

Another effect of this elimination of scum is that owing to the sudden release of pressure when the mash has come out of the nozzles the carbonic acid and thus a growth preventing agent is practically completely removed from the mash.

When it is desired to obtain nutrient yeast and yeast for fodder, particularly if large quantities thereof are to be produced, the yeast is preferably precipitated from the mash. In an automatic yeast producing apparatus of the kind described continuous precipitation is carried out in a special container. After the mother yeast has been removed from the mash and a precipitant of known type has been added to the latter, the mash flows through a container on whose bottom the precipitated yeast slime settles which is conducted to the separator while the supernatant clear mash continuously flows to a discharge channel. The application of this process involves a 50% to 70% saving in separator work.

I claim:

1. A process for the continuous cultivation of yeast by causing the mash to flow downwardly and upwardly in a predetermined path, supplying it with fresh air, wherein the fresh yeast will be introduced in the liquid under and near its level by flowing downwardly and controlling the speed of circulation of the mash in its travel in the respective paths.

2. A process for the continuous cultivation of yeast, consisting in causing the yeast-containing mash to flow through a plurality of predetermined paths, bringing all yeast cells contained in the mash into repeated contact with fresh air through the control of the speed of circulation of the mash.

3. A process according to claim 1, in which the size and form of the gas or air bubbles introduced into the liquid are influenced by varying the velocity of the flow of the liquid.

4. A process according to claim 2, in which each growth promoting path is supplied with equal amounts of air per unit of volume.

5. A process for the continuous cultivation of yeast, consisting in providing a flow of liquid directed downwardly followed by the flow of liquid directed upwardly, the liquid traveling through predetermined paths, the upwardly moving path being concentric with and surrounding the downwardly moving path.

6. A process as described in claim 5, wherein the liquid is subjected to suction in the lower part of the downwardly directed path to impart a striated appearance to the gas bubbles.

7. A process according to claim 5, wherein rotary motion is imparted to the liquid through the downwardly directed path to cause the air bubbles entering the liquid to acquire a spiral-like motion.

8. A process according to claim 5, wherein the liquid flowing through the upwardly directed path is subjected to a force to induce a rotary motion therein.

EUGEN STICH.